United States Patent
Liu (10) Patent No.: US 10,713,767 B2
(45) Date of Patent: Jul. 14, 2020

(54) REGULATION METHOD, TERMINAL EQUIPMENT AND NON-TRANSITORY COMPUTER-READABLE STORAGE MEDIUM FOR AUTOMATIC EXPOSURE CONTROL OF REGION OF INTEREST

(71) Applicant: GUANGDONG OPPO MOBILE TELECOMMUNICATIONS CORP., LTD., Dongguan, Guangdong (CN)

(72) Inventor: Kai Liu, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 182 days.

(21) Appl. No.: 16/030,175

(22) Filed: Jul. 9, 2018

(65) Prior Publication Data

US 2019/0012776 A1  Jan. 10, 2019

(30) Foreign Application Priority Data

Jul. 10, 2017  (CN) .......................... 2017 1 0558352

(51) Int. Cl.
| | | |
|---|---|---|
| G06T 5/40 | (2006.01) | |
| H04N 5/235 | (2006.01) | |
| H04N 5/232 | (2006.01) | |
| H04N 9/07 | (2006.01) | |
| G06T 7/70 | (2017.01) | |

(52) U.S. Cl.
CPC ................. G06T 5/40 (2013.01); G06T 7/70 (2017.01); H04N 5/2351 (2013.01);
(Continued)

(58) Field of Classification Search
CPC ........... G06T 5/40; G06T 7/70; H04N 5/2351; H04N 5/23219; H04N 9/07; H04N 5/2353; H04N 5/235; H04N 5/243
See application file for complete search history.

(56) References Cited

U.S. PATENT DOCUMENTS 8,339,506 B2  12/2012  Hung et al.
8,483,507 B2  7/2013  Canon
(Continued)

FOREIGN PATENT DOCUMENTS

CN  101013250 A  8/2007
CN  101304489 A  11/2008
(Continued)

OTHER PUBLICATIONS

Englis abstract of CN102495511A.
(Continued)

Primary Examiner — Menatoallah Youssef
(74) Attorney, Agent, or Firm — Ladas & Parry LLP (57) ABSTRACT

Provided are a regulation method, terminal equipment, and non-transitory computer-readable storage medium for automatic exposure control (AEC) of a region of interest. In the method, a luminance histogram of each color channel in a region of interest is obtained based on statistics on luminance of a plurality of sub-region blocks in the region of interest; a first luminance of the each color channel is determined according to the luminance histogram of the each color channel in the region of interest and the corresponding relationship between the luminance and the number of the sub-region blocks; a reference luminance is determined based on the first luminance of the each color channel, the reference luminance corresponding to a reference color channel; a target luminance corresponding to the present AEC luminance is obtained; and a luminance regulation is performed on the reference color channel according to the target luminance.

20 Claims, 7 Drawing Sheets

(52) U.S. Cl.
CPC ....... *H04N 5/2353* (2013.01); *H04N 5/23219* (2013.01); *H04N 9/07* (2013.01)

(56) References Cited

U.S. PATENT DOCUMENTS

| | | | |
|---|---|---|---|
| 2007/0216777 | A1 | 9/2007 | Ouan et al. |
| 2008/0056704 | A1 | 3/2008 | Ovsiannikov |
| 2009/0225182 | A1 | 9/2009 | Tamura |
| 2010/0208105 | A1 | 8/2010 | Kubota |
| 2010/0271507 | A1* | 10/2010 | Hung .............. H04N 5/23219 348/231.99 |
| 2011/0279710 | A1 | 11/2011 | Lee |
| 2014/0348399 | A1* | 11/2014 | Kuo .............. G06K 9/00288 382/118 |

FOREIGN PATENT DOCUMENTS

| | | |
|---|---|---|
| CN | 101523888 A | 9/2009 |
| CN | 102495511 A | 6/2012 |
| CN | 105227857 A | 1/2016 |
| CN | 105608677 A | 5/2016 |
| CN | 105827995 A | 8/2016 |
| CN | 107343156 A | 11/2017 |
| EP | 2146306 A2 | 1/2010 |

OTHER PUBLICATIONS

English abstract of CN105227857A.
First Chinese Office Action with English translation of CN Application No. 201710558352.2, dated Apr. 15, 2019, (6 pages).
International Search Report for PCT application No. PCT/CN2018/094894 filed on Jul. 6, 2018; dated Sep. 29, 2018.
Extended European Search Report for EP application No. 18182455.8, dated Nov. 20, 2018.
English abstract of CN 107343156 A.
Espacenet English abstract of CN 105827995 A.
Espacenet English abstract of CN 101013250 A.
Espacenet English abstract of CN 101304489 A.

* cited by examiner

Obtain a luminance histogram of each color channel in a region of interest based on statistics on luminance of a plurality of sub-region blocks in the region of interest — 302

Determine a first luminance of the each color channel according to the luminance histogram of the each color channel in the region of interest and the corresponding relationship between the luminance and the number of the sub-region blocks, the first luminance being associated with a present AEC luminance; and a reference luminance is determined based on the first luminance of the each color channel, the reference luminance corresponding to a reference color channel — 304

Obtaining target luminance corresponding to the present AEC luminance, and perform luminance regulation on the reference color channel according to the target luminance — 306

REGULATION METHOD, TERMINAL EQUIPMENT AND NON-TRANSITORY COMPUTER-READABLE STORAGE MEDIUM FOR AUTOMATIC EXPOSURE CONTROL OF REGION OF INTEREST

TECHNICAL FIELD

The present disclosure relates to a technical field of exposure processing, and particularly to a regulation method, terminal equipment, and a non-transitory computer-readable storage medium for automatic exposure control (AEC) of a region of interest.

BACKGROUND

Along with the popularization of terminal equipment such as smart phones, users have more and more diversified requirements on functions of terminal equipment. For example, a camera function of terminal equipment may bring great convenience to production and life of users and thus is widely needed by the users. A key to guarantee quality of an image shot by a camera lies in exposure control. Exposure control aims to reduce overexposed and underexposed regions in an image as much as possible, meanwhile luminance of the present image is ensured to be consistent with expected luminance.

In a related technology, an AEC technology is adopted to control a sensor and Image Signal Processor (ISP) of a camera to perform overall exposure control over an image, thereby automatically obtaining reasonable image luminance.

However, in the AEC technology, a mainstream AEC algorithm controls image luminance based on luminance information of a whole frame of an image. When a portrait is shot, if a difference between luminance of a region of interest and luminance of a region around the region of interest is relatively large, such a manner of performing exposure control based on average luminance may easily make the region of interest overexposed. Overexposure of an image may make information unrecoverable and reduce quality of the shot image.

SUMMARY

The embodiments of the present disclosure provide a regulation method, terminal equipment, and a non-transitory computer-readable storage medium for AEC of a region of interest.

In at least one alternative embodiment, a regulation method for AEC of a region of interest is provided, including: obtaining a luminance histogram of each color channel in a region of interest based on statistics on luminance of a plurality of sub-region blocks in the region of interest, a luminance histogram of a color channel including a corresponding relationship between a luminance and a number of sub-region blocks of the color channel; determining a first luminance of the each color channel according to the luminance histogram of the each color channel in the region of interest and the corresponding relationship between the luminance and the number of the sub-region blocks, the first luminance being associated with a present AEC luminance; determining a reference luminance based on the first luminance of the each color channel, the reference luminance corresponding to a reference color channel; obtaining a target luminance corresponding to the present AEC luminance; and performing a luminance regulation on the reference color channel according to the target luminance.

In at least one alternative embodiment, terminal equipment is provided, including: at least one processor; and a computer readable storage, coupled to the at least one processor and storing at least one computer executable instructions thereon, which when the at least one computer executable instructions is executed by the at least one processor, cause the at least one processor to carry out following actions: dividing the region of interest into a plurality of sub-region blocks, and obtaining a luminance histogram of each color channel in the region of interest based on statistics on luminance of the plurality of sub-region blocks in the region of interest, a luminance histogram of a color channel including a corresponding relationship between a luminance and a number of sub-region blocks of the color channel; determining lowest luminance of each color channel which meets present AEC luminance according to the luminance histogram of the each color channel and the corresponding relationship between the luminance and the number of the sub-region blocks; obtaining a maximum value from the lowest luminance of respective color channels to determine reference luminance, and obtaining a reference color channel corresponding to the reference luminance; obtaining a target luminance corresponding to the present AEC luminance; and performing luminance convergence regulation on the reference color channel according to the target luminance.

In at least one alternative embodiment, a non-transitory computer-readable storage medium is provided, on which a computer program is stored, wherein the computer program is executed by a processor to carry out following actions: obtaining a luminance histogram of each color channel in a region of interest based on statistics on luminance of a plurality of sub-region blocks in the region of interest, a luminance histogram of a channel including a corresponding relationship between a luminance and a number of sub-region blocks of the color channel; determining a first luminance of the each color channel according to the luminance histogram of the each color channel in the region of interest and the corresponding relationship between the luminance and the number of the sub-region blocks, the first luminance being associated with a present AEC luminance; determining a reference luminance based on the first luminance of the each color channel, the reference luminance corresponding to a reference color channel; obtaining a target luminance corresponding to the present AEC luminance; and performing a luminance regulation on the reference color channel according to the target luminance.

Part of additional aspects and advantages of the present disclosure will be presented in the following descriptions, and part thereof will become obvious from the following descriptions or will be understood by implementing the present disclosure.

BRIEF DESCRIPTION OF THE DRAWINGS

The abovementioned and/or additional aspects and advantages of the present disclosure will become obvious and be understood easily from the descriptions made below to the embodiments in combination with the drawings, wherein.

DETAILED DESCRIPTION OF THE EMBODIMENTS

The embodiments of the present disclosure will be described below in detail. Examples of the embodiments are shown in the drawings, wherein the same or similar reference signs are adopted to represent the same or similar components or components with the same or similar functions. The following embodiments described with reference to the drawings are only exemplary and are intended to explain the present disclosure and should not be understood as limits to the present disclosure.

From the previous analysis, it can be seen that, in an AEC technology, luminance is regulated according to average luminance information of a whole frame of an image, and when a difference between luminance of a region of interest and luminance of a region around the region of interest is relatively large, for example, the luminance of the region of interest is higher than that of the region around the region of interest, it is very likely to overexpose the region of interest and form color spots, thereby causing poorer image quality and making a user unsatisfied with the shot image.

Figure 1:
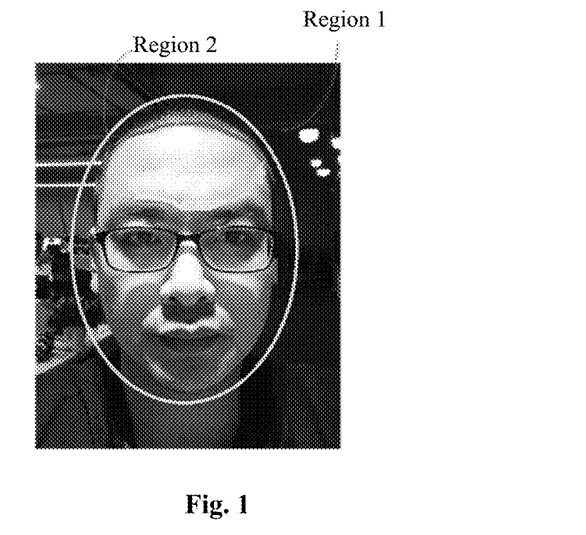
FIG. 1 is a schematic diagram illustrating a luminance distribution when a face image is practically shot in an exemplary application scenario.

For example, when an image including a face is shot, luminance of a region of interest (i.e., a face region in the present example) in a shot image may be greatly different from luminance of the other regions because of the influence of environmental light, for example, light illuminating a position of the face is higher than that of the other regions. As shown in FIG. 1, luminance of a region 1 where the face is positioned is higher than luminance of a region 2 around the face. When luminance regulation is performed based on luminance information of the whole frame of image shown in FIG. 1, the region 1 is influenced by averaging effect between the region 1 and the region 2, and the luminance of the region 1 where the face is positioned may not be sufficiently converged, so that there may exist the condition that the face is overexposed.

For solving the technical problem, an embodiment of the present disclosure discloses a technical solution of performing luminance regulation based on luminance of a region of interest. In the technical solution, luminance control is performed based on luminance of the region of interest, thereby implementing accurate exposure control, eliminating an overexposed region of the region of interest and a consequent color spot phenomenon, effectively improving quality of an image and improving a degree of satisfaction of a user.

A regulation method and device for AEC of a region of interest provided in the embodiments of the present disclosure will be described below with reference to the drawings.

An embodiment of the present disclosure can eliminate an overexposed region in an image and avoid poorer image quality caused by color spots formed by overexposure. Actually, such an overexposed region may be present in an image including any subject of interest (e.g., a face, the sky, a building). For convenient description, descriptions in the following embodiments of the present disclosure are made mainly on control over an overexposed region of a face region as shown in the FIG. 1. The technical solution provided in the embodiments of the present disclosure also applies to any region of interest including at least one of, for example, a face region, a sky region and a building region.

During a practical application, different implementation modes may be adopted to determine a region of interest according to exemplary application scenarios. Descriptions will be made below with examples.

A First Example

Subject identification is performed on an image to identify the region of interest.

A Second Example

Contour extraction is performed on the image. For example, a depth information extraction is performed based on corresponding image depth information, and a contour where the region of interest is positioned can be identified according to the different depth information of the region of interest and the other regions, so that a position of the contour is namely the region of interest.

A Third Example

Figure 2A:
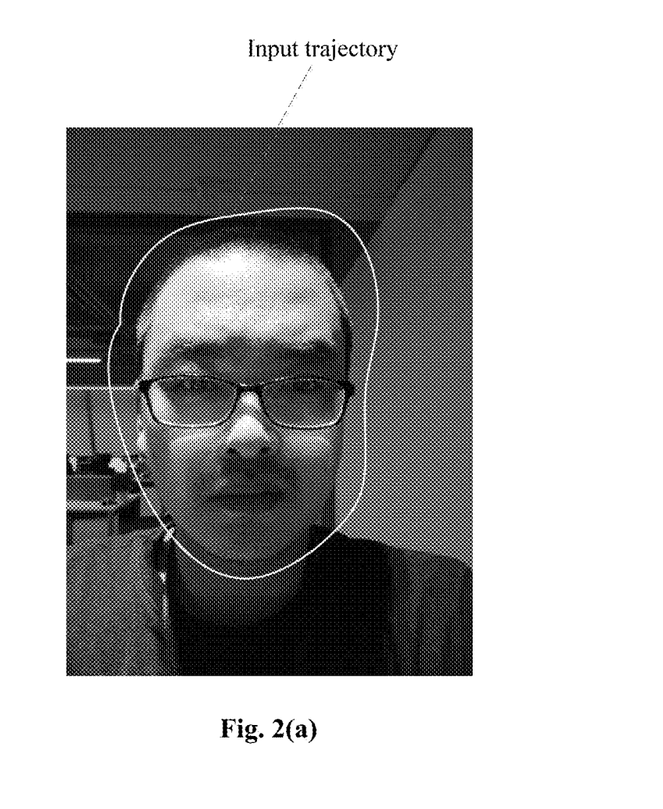
FIG. 2(a) is a schematic diagram illustrating a scenario of selecting a region of interest according to an embodiment of the present disclosure.
Figure 2B:
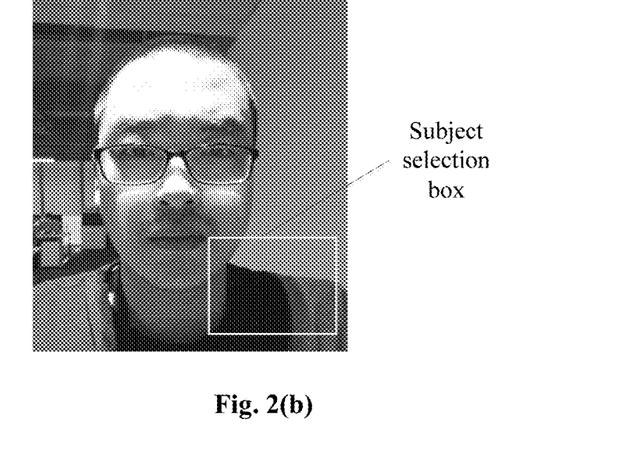
FIG. 2(b) is a schematic diagram illustrating a scenario of selecting a region of interest according to another embodiment of the present disclosure.

When terminal equipment displays a preview image to a user in an image previewing region, selection of the user over the region of interest can be received. For example, as shown in FIG. 2(a), the user inputs a trajectory in the image previewing region, and a region encircled by the input trajectory can be determined as the region of interest. For another example, as shown in FIG. 2(b), a subject selection box is provided, and the user may drag the subject selection box to select the corresponding region of interest, and in this example, a size of the subject selection box may be regulated according to a requirement.

Figure 3:
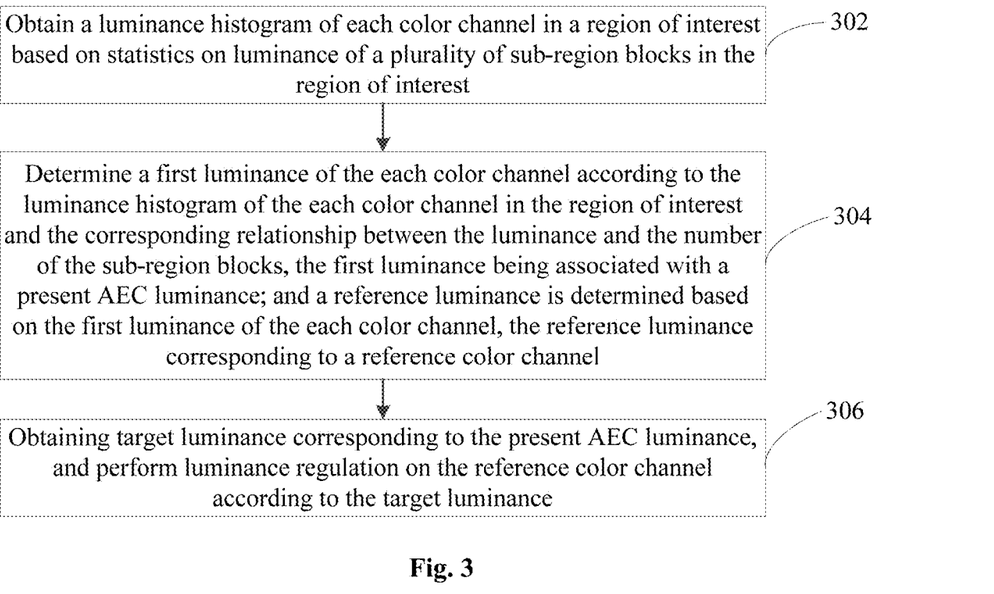
FIG. 3 is a flowchart illustrating a regulation method for AEC of a region of interest according to an embodiment of the present disclosure.

FIG. 3 is a flowchart illustrating a regulation method for AEC of a region of interest according to an embodiment of the present disclosure.

The regulation method for AEC of the region of interest includes the following operations in blocks illustrated in FIG. 3.

In block 302, a luminance histogram of each color channel in a region of interest is obtained based on statistics on luminance of a plurality of sub-region blocks in the region of interest, a luminance histogram of a color channel including a corresponding relationship between a luminance and a number of sub-region blocks of the color channel.

In an example of above operation at block 302, the face region may be divided into multiple sub-region blocks, and statistics may be performed on luminance of all of the plurality of sub-region blocks to construct a luminance histogram of each color channel in the region of interest, wherein the luminance histogram includes a corresponding relationship between luminance and the number of sub-region blocks.

It can be understood that a luminance distribution difference for the region of interest only may also be obvious and, if luminance regulation is performed only according to average luminance of the region of interest, an effect of removing an overexposed region may be not so ideal. Therefore, in an embodiment of the present disclosure, for ensuring that an overexposed region may be effectively captured based on the statistical data without being influenced by the process of averaging, the region of interest is divided into a plurality of sub-region blocks for statistics on luminance information.

For really preventing influence of averaging, a division granularity of the plurality of sub-region blocks is suggested to be small enough relative to an area of the region of interest and, for example, each sub-region blocks may occupy 0.1% of a total area of the region of interest. Of course, during a practical application, different modes may be adopted to implement division of the plurality of sub-region blocks in the region of interest according to different exemplary application scenarios. Descriptions will be made with examples.

As a possible implementation mode, the plurality of sub-region blocks in the region of interest may be a plurality of sub-region blocks obtained in a following manner. An area of the region of interest is obtained, a total number of the plurality of sub-region blocks corresponding to the area is determined according to preset division granularity information, and the region of interest is divided into a plurality of sub-region blocks according to the total number of the plurality of sub-region blocks.

In an example, the preset division granularity information may include a corresponding relationship between an area of a region of interest and the number of sub-region blocks, for example, as shown in following Table 1. A total number of sub-region blocks (or a selection range of the total number, only exemplary total numbers of sub-region blocks are shown in Table 1) capable of eliminating influence of averaging under each region area (or under a region area within a certain range, only corresponding relationships of exemplary region areas are shown in Table 1) is obtained and stored in advance based on results of experiments. In this way, the corresponding relationship may be queried according to the obtained area of the region of interest to determine the total number of the sub-region blocks corresponding to the area.

TABLE 1

| Area of region of interest | a | b | c | ... |
|---|---|---|---|---|
| Total number of sub-region blocks | T1 | T2 | T3 | ... |

As another possible implementation mode, the plurality of sub-region blocks in the region of interest may be a plurality of sub-region blocks obtained in a following manner. An area of the region of interest is obtained, a total number of the plurality of sub-region blocks corresponding to the area is determined according to division ratio information, and the region of interest is divided into a plurality of sub-region blocks according to the total number of the plurality of sub-region blocks.

In an example, the division ratio information may include a first ratio of a total number of sub-region blocks to an area of a region of interest. For instance, a first ratio s of a total number of sub-region blocks to a total area of a region of interest is set in advance according to results of experiments. If the first ratio s of the total number of the sub-region blocks to the total area of the region of interest may effectively eliminate the influence of averaging the region of interest, after an area m of the region of interest is obtained, a product value of m*s can be determined as the total number of the sub-region blocks, and the region of interest can be divided into a plurality of sub-region blocks according to the total number of the plurality of sub-region blocks.

In an example of above operation at block 302, the region of interest is divided into a plurality of sub-region blocks, and statistics is performed on the luminance of all of the plurality of sub-region blocks to construct the luminance histogram of each color channel in the region of interest, wherein a luminance histogram of a color channel includes the corresponding relationship between the luminance and the number of the sub-region blocks, for example, the number of sub-region blocks corresponding to each luminance in an R channel. Based on the luminance histogram, an exemplary luminance distribution of the region of interest can be learned.

The luminance of each sub-region block may be average luminance in the sub-region block, and may alternatively be luminance of a central position in the sub-region block. The exemplary implementations of the determination of the luminance of each sub-region block will not be listed one by one herein.

Figure 4A:
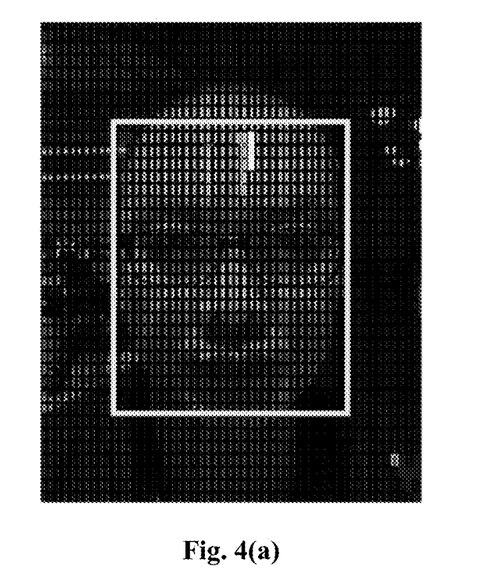
FIG. 4(a) is a schematic diagram illustrating a scenario of dividing a region of interest into a plurality of sub-region blocks according to an embodiment of the present disclosure.
Figure 4B:
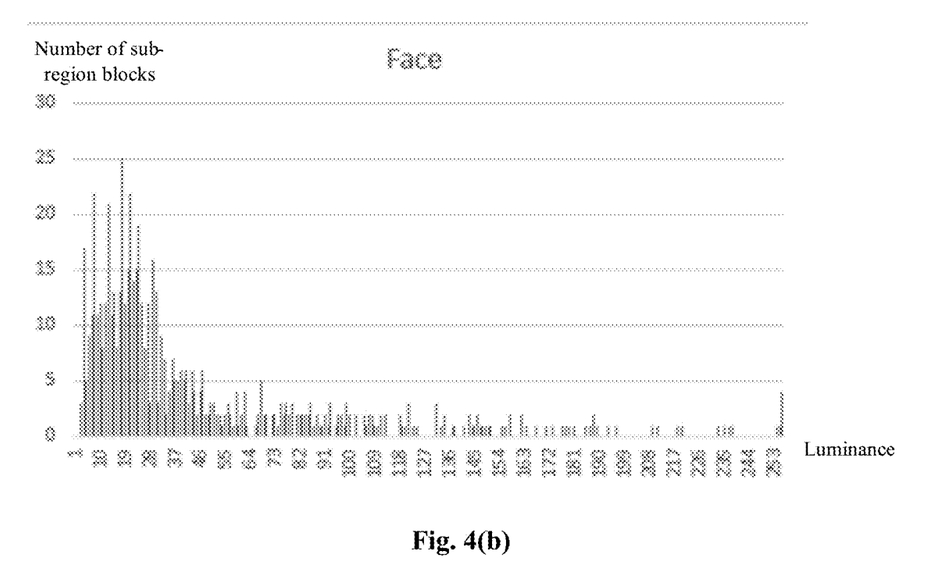
FIG. 4(b) is a schematic diagram illustrating a luminance histogram according to an embodiment of the present disclosure.

For example, as shown in FIG. 4(*a*), when an image includes four color channels R, Gr, Gb and B, the region of interest is divided into a plurality of sub-region blocks, and statistics is performed on luminance of all of the plurality of sub-region blocks to construct a luminance histogram of each color channel in the region of interest. For example, the luminance histogram of the Gr channel is shown in FIG. 4(*b*). The number of sub-region blocks corresponding to each luminance in a luminance range of 0-255 may be obtained according to the luminance histogram shown in FIG. 4(*b*).

In block 304, a first luminance of the each color channel is determined according to the luminance histogram of the each color channel in the region of interest and the corresponding relationship between the luminance and the number of the sub-region blocks, the first luminance being associated with a present AEC luminance; and a reference luminance is determined based on the first luminance of the each color channel, the reference luminance corresponding to a reference color channel.

In an exemplary implementation of block 304, the operation of determining the reference luminance based on the first luminance of the each color channel may be implemented in the following manner. A maximum value in all the lowest luminance may be determined as the reference luminance.

In an exemplary implementation of block 304, the first luminance may be a lowest luminance of the each color channel which meets a requirement of the present AEC luminance.

In an exemplary implementation, the luminance histogram of each color channel may be analyzed according to a descending order of the luminance, corresponding lowest luminance of each color channel which meets present AEC luminance may be determined according to the corresponding relationship between the luminance and the number of the sub-region blocks. For example, the operation that the first luminance of the each color channel is determined according to the luminance histogram of the each color channel in the region of interest and the corresponding relationship between the luminance and the number of the sub-region blocks may be implemented in a following manner. A total luminance value of the each color channel within a luminance range may be determined according to a descending order of the luminance based on the luminance histogram of the each color channel and the corresponding relationship between the luminance and the number of the sub-region blocks; and the lowest luminance of the each color channel which meets a requirement of the present AEC luminance may be determined according to the total luminance value, the luminance range and the present AEC luminance. For example, a minimum luminance in the luminance range within which the total luminance value is equal to the present AEC luminance or is larger than the present AEC luminance for a first time may be determined to be the lowest luminance of the each color channel which meets a requirement of the present AEC luminance.

It can be understood that the condition that the region of interest is overexposed may be caused by supersaturation of one or some color channels. If the first saturated color channel is captured and luminance control is performed for this saturated color channel to prevent overexposure, the overexposed region may be eliminated most effectively. Under a normal condition, the number of the sub-region blocks with higher luminance in the first saturated color channel is likely to be relatively larger, therefore the luminance histogram of each color channel may be analyzed according to the descending order of the luminance to efficiently determine the first saturated color channel.

The luminance histogram of each color channel may be analyzed according to the descending order of the luminance, and the corresponding lowest luminance of each color channel which meets a requirement of the present AEC luminance may be determined according to the corresponding relationship between the luminance and the number of the sub-region blocks.

That is, a luminance value (statistics is performed on the luminance in a descending order starting from 255) for each color channel under a certain overexposure rate can be obtained according to information of the luminance histogram. Herein, a value of the overexposure rate may be set by a parameter (for example, an exposure time). The lowest luminance of each color channel, or the lowest luminance obtained by accumulation calculation can be obtained, when control luminance corresponding to the overexposure rate adopted during AEC is achieved in each color channel. The control luminance corresponding to the overexposure rate adopted during AEC represents reference luminance for judging whether color luminance is saturated or not under the overexposure rate.

For making those skilled in the art understand more clearly how to determine the corresponding lowest luminance of each color channel which meets a requirement of the present AEC luminance, descriptions will be made below with the corresponding lowest luminance of the color channel R which meets a requirement of the present AEC luminance as an example.

In the example, the overexposure rate for AEC is 1% and the corresponding AEC luminance is L, and statistics is performed starting from luminance peak (i.e., maximum luminance), the value of which is 255, in the color channel R. The number of sub-region blocks, the luminance value of which is 255, is 0, then in such a case, a luminance value under the luminance 255 in the color channel R is 0. The number of sub-region blocks, the luminance value of which is 254, is 0, then in such a case, a luminance value within a luminance range of 255-254 in the color channel R is 0+0=0. The number of sub-region blocks, the luminance value of which is 253, is 1, and an area of the obtained sub-region blocks is S1, assuming that an area of the whole frame of image is $S_{total}$ and a total number of pixels is 13,000,000, then in such a case, the luminance value within the luminance range of 255-253 in the color channel R is $$0 + 0 + \frac{S1}{Stotal} * 255 * 13,000,000 = \frac{S1}{Stotal} * 255 * 13,000,000.$$

Accumulation calculation is performed in turn, and a superimposed value obtained every time is compared with the AEC luminance L. If the number of sub-region blocks, the luminance value of which is 240, is calculated to be 7, then in such a case, the luminance value within the luminance range of 255-240 in the color channel R is $$0 + 0 + \frac{S1}{Stotal} * 255 * 13,000,000 + \ldots + \frac{S1}{Stotal} * 255 * 13,000,000 * 7 = L1.$$

If L1 is equal to the AEC luminance L (or larger than L for the first time), then the lowest luminance in the color channel R is 240, which means that luminance of a plurality of sub-region blocks included between luminance values 240 and 255 in the color channel R is higher.

The maximum value is selected from all the lowest luminance to determine the reference luminance. For example, when the image includes four color channels R, Gr, Gb and B and lowest luminance corresponding to each color channel is 240, 35, 90 and 125 respectively, then the luminance 240 is determined as the reference luminance. Furthermore, the reference color channel corresponding to the reference luminance is determined. For example, the reference color channel corresponding to the luminance 240 is determined to be the color channel R.

In block 306, target luminance corresponding to the present AEC luminance is obtained, and luminance regulation, for example, luminance convergence regulation is performed on the reference color channel according to the target luminance.

It can be understood that, after the reference color channel causing an overexposure phenomenon to the region of interest, and the reference luminance, which saturates the reference color channel, in the reference color channel are determined, a cause of the overexposure condition of the region of interest is therefore determined. At this moment, luminance convergence regulation can be performed to address the cause.

The target luminance corresponding to the present AEC luminance is obtained, and luminance convergence regulation is performed on the reference color channel according to the target luminance. For example, for the reference color channel R, the reference luminance corresponding to the reference color channel R is 240 and the determined target luminance is 210. At this moment, luminance regulation can be performed on the reference color channel to converge the luminance in the color channel according to the luminance 210. In this way, the luminance of the region of interest is reduced so that the overexposed region is controlled, thereby eliminating the color spots formed by overexposure.

During practical operations, different manners may be selected to determine the target luminance according to different application scenarios. As a possible implementation mode, a second luminance corresponding to the present AEC luminance may be obtained based on first preset AEC information, the second luminance serving as the target luminance. As an exemplary implementation, first AEC information may be preset, the first AEC information including a corresponding relationship between target luminance and reference luminance, so that the first preset AEC information may be queried to obtain second luminance corresponding to the present AEC luminance, wherein the second luminance serves as the target luminance.

As another possible implementation mode, the target luminance is related to a pixel proportion in sub-region blocks included between the reference luminance and luminance peak (i.e., maximum luminance). When the pixel proportion is relatively lower, it represents that a small number of pixels in the reference color channel contribute much to the luminance and the reference color channel contributes much to the luminance of the whole region of interest. Then in such a case, target luminance is determined to be relatively lower, so as to control luminance convergence to be performed on the reference color channel to a relatively higher extent. When the pixel proportion is relatively higher, it represents that a large number of pixels in the reference color channel make a certain contribution to the luminance, then in such a case, target luminance is determined to be relatively higher, so as to control luminance convergence to be performed on the reference color channel to a relatively lower extent.

As another possible implementation mode, a sum of the numbers of sub-region blocks corresponding to respective luminance between the reference luminance and a luminance peak may be determined; a second ratio of the sum to a total number of the plurality of sub-region blocks in the region of interest may be determined; and fourth luminance corresponding to the second ratio may be obtained based on third preset AEC information, the fourth luminance serving as the target luminance. For example, a sum of the numbers of sub-region blocks corresponding to respective luminance between the reference luminance and a luminance peak may be calculated, a second ratio of the sum to the total number of all the sub-region blocks in the region of interest may be calculated, and a third preset AEC information may be queried to obtain fourth luminance corresponding to the second ratio, wherein the fourth luminance serves as the target luminance.

It is important to note that, during a practical application, even though luminance convergence regulation is performed on the reference color channel according to the second luminance, it may be not ensured that a luminance distribution in the region of interest is consistent with that seen by human eyes. As a matter of fact, a response of the human eyes to the luminance is not a linear proportional relationship, and input and output characteristic features of various equipment related to photoelectric conversion are usually nonlinear and are presented as power functions, so that a transmission function of the whole image system is a power function.

The response of an image sensor is approximate to a linear relationship. If the image to be rendered is directly displayed on a display screen without correction, even though the region of interest in the image on which luminance convergence is performed according to the second luminance is prevented from being overexposed, there may still exist the condition that the region of interest in the image presented on the display screen is overexposed. Therefore, for correctly outputting an image consistent with the response of the human eyes to the luminance on various pieces of the equipment, a corresponding correction operation is suggested to be performed, and a correction function may adopt a gamma curve.

Therefore, in an embodiment of the present disclosure, after the second luminance corresponding to the present AEC luminance is obtained, third luminance corresponding to the second luminance is obtained by adopting the gamma curve corresponding to the second luminance, and luminance convergence regulation is performed on the reference color channel according to the third luminance to ensure relatively higher quality of the region of interest in the image displayed on the display screen.

Based on the above processing process, it should be understood that AEC is performed on the whole frame of image at first before implementing a luminance convergence process in the region of interest. In the AEC process, luminance regulation is performed based on average luminance information of the whole frame of image to increase luminance of a dark region of the whole frame of image to a certain extent and decrease luminance of a bright region to a certain extent, so as to implement preliminary luminance regulation processing on the whole frame of image.

When a difference between luminance of a region of interest and other regions in a portrait image is relatively large, an extent of image processing performed according to average luminance of the whole frame of image is obviously insufficient. Therefore, it is suggested to additionally perform luminance regulation in the region of interest. After luminance regulation is additionally performed in the region of interest, the luminance of the region of interest is further converged, so that the average luminance of the whole frame of image is lower than the target luminance for the whole frame of image. When a luminance processing result of the whole frame of image is corrected by AEC through a mainstream control algorithm, since it may be determined that the present regulation result is relatively lower than the target luminance for the whole frame of image, reverse regulation may be performed. However, such reverse regulation is unnecessary. Therefore, for avoiding reverse regulation, it is suggested to prevent an original AEC logic from performing reverse control after luminance regulation is performed in the region of interest, so as to avoid oscillation.

Figure 5:
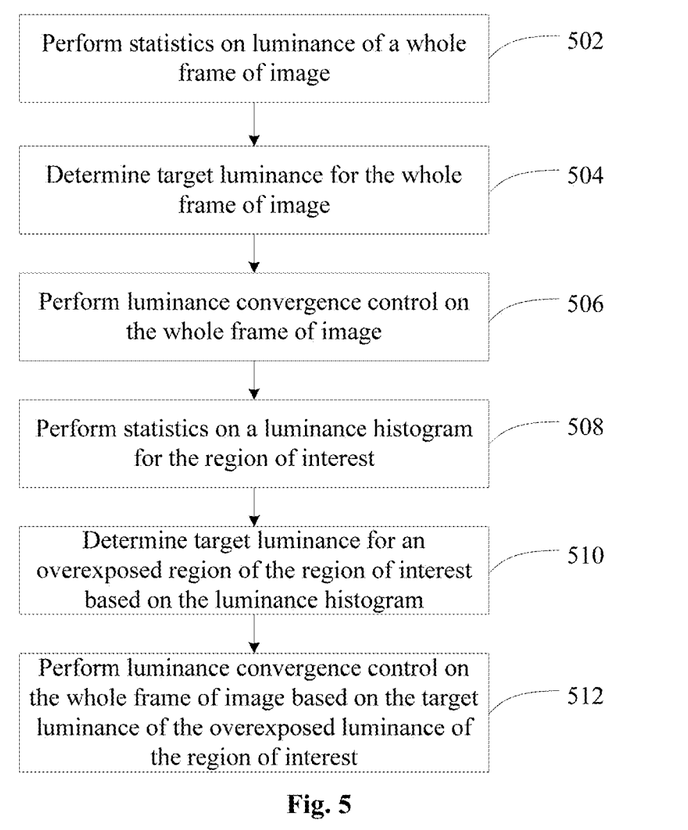
FIG. 5 is a flowchart illustrating a regulation method for AEC of a region of interest according to an exemplary embodiment of the present disclosure.

In a practical processing process, a regulation method for AEC of a region of interest according to an exemplary embodiment may include the following operations in blocks illustrated in FIG. 5.

In block 502, AEC is performed on the whole frame of image at first, and statistics is performed on luminance of the whole frame of image.

In block 504, luminance calculation is performed to determine the target luminance corresponding to the whole frame of image.

In block 506, luminance convergence control is performed according to the target luminance corresponding to the whole frame of image.

When this method of the embodiment is adopted, since statistics is performed according to the luminance of the whole frame of image, a convergence degree of a relatively brighter region of interest may be insufficient. To solve this problem, it is suggested to perform statistics on a luminance histogram of the region of interest and perform luminance convergence regulation on the whole frame of image according to a statistical result of the luminance histogram in the region of interest to effectively eliminate the color spots in the region of interest, as described in the following blocks 508 to 512.

In block 508, statistics is performed on a luminance histogram for the region of interest.

In block 510, a target luminance for an overexposed region of the region of interest is determined based on the luminance histogram.

In block 512, luminance convergence control is performed on the whole frame of image based on the target luminance of the overexposed luminance of the region of interest.

Figure 6:
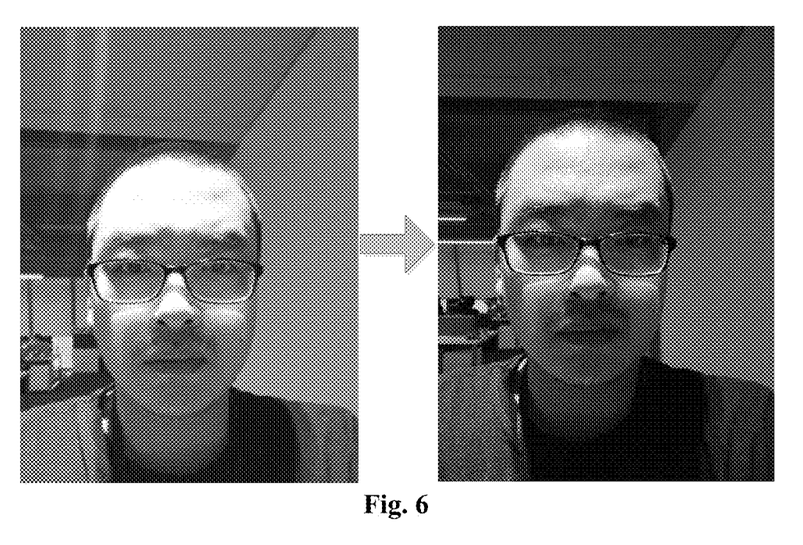
FIG. 6 is a schematic diagram illustrating image effects before and after regulation of AEC of a region of interest according to an embodiment of the present disclosure.

For presenting the processing effect more clearly, descriptions will be made below in combination with exemplary processing effect diagrams. As shown in the left figure of FIG. 6, before the regulation method for AEC of the region of interest is implemented and after conventional-logic-based AEC is performed, the region of interest has a strongly overexposed region and a consequent color spot phenomenon. After the regulation method for AEC of the region of interest described in the abovementioned embodiment is applied, as shown in the right figure of FIG. 6, the color spots in the region of interest are eliminated, and the obtained image is softer and is of relatively higher quality.

To sum up, according to the regulation method for AEC of the region of interest in the embodiments of the present disclosure, the region of interest is divided into a plurality of sub-region blocks, statistics is performed on the luminance of all of the plurality of sub-region blocks to construct the luminance histogram of each color channel in the region of interest, the luminance histogram of each color channel is analyzed according to the descending order of the luminance, the corresponding lowest luminance of each color channel which meets a requirement of the present AEC luminance is determined according to the corresponding relationship between the luminance and the number of the sub-region blocks, the maximum value is selected from all the lowest luminance to determine reference luminance and a reference color channel corresponding to the reference luminance, the target luminance corresponding to the present AEC luminance is obtained, and luminance convergence regulation is performed on the reference color channel according to the target luminance. By adopting the technical solution of the embodiment, accurate exposure control can be implemented, an overexposed region of the region of interest and a consequent color spot phenomenon can be eliminated, quality of an image can be effectively improved, and a degree of satisfaction of a user can be improved.

Based on the abovementioned embodiment, it should also be understood that, since a control logic of AEC is able to conduct control over the whole frame of image and cannot conduct control over a local region, after the regulation method for AEC of the region of interest described in the abovementioned embodiments is applied, although the color spots are eliminated, the luminance of the other regions is also decreased. As a result, in some scenarios, some regions of which the luminance is originally lower may be further decreased and thus some image details may be lost. Therefore, for avoiding such loss, some compensation operations may be adopted in the practical operation process.

For example, after luminance convergence is performed according to the region of interest, a reverse luminance recovery operation may be performed on some regions with relatively lower luminance according to a convergence degree in combination with coactions of other nonlinear luminance control modules of an ISP, so that the regions with relatively lower luminance may be prevented from being influenced by luminance convergence performed according to the region of interest.

Figure 7:
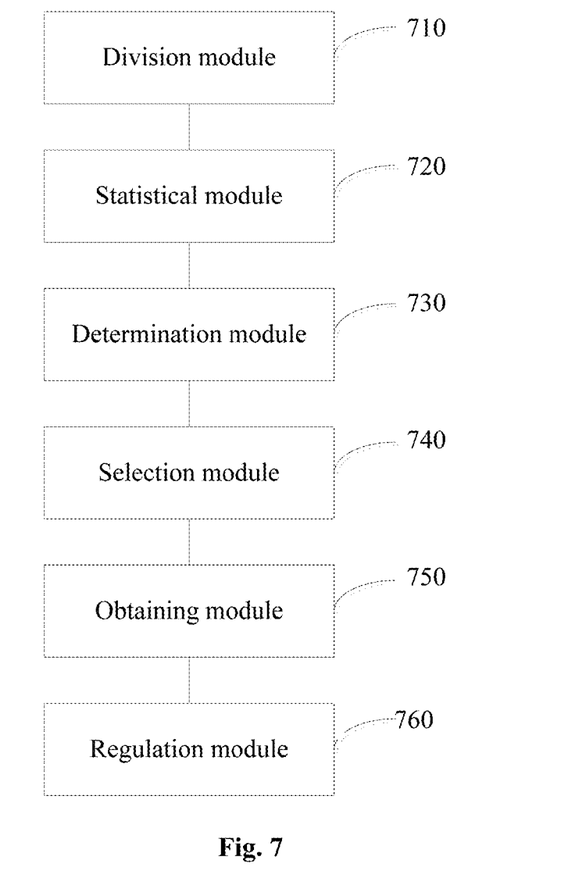
FIG. 7 is a structure schematic diagram illustrating a regulation device for AEC of a region of interest according to an embodiment of the present disclosure.

For implementing the abovementioned embodiment, an embodiment of the present disclosure provides a regulation device for AEC of a region of interest. FIG. 7 is a structure schematic diagram illustrating a regulation device for AEC of a region of interest according to an embodiment of the present disclosure. As shown in FIG. 7, the regulation device for AEC of the region of interest includes: a division module 710, a statistical module 720, a determination module 730, a selection module 740, an obtaining module 750, and a regulation module 760.

The division module 710 is configured to divide the region of interest into a plurality of sub-region blocks. The statistical module 720 is configured to perform statistics on luminance of all of the plurality of sub-region blocks to construct a luminance histogram of each color channel in the region of interest, wherein the luminance histogram includes a corresponding relationship between luminance and the number of sub-region blocks.

The determination module 730 is configured to analyze the luminance histogram of each color channel according to a descending order of the luminance, and determine corresponding lowest luminance of each color channel which meets a requirement of present AEC luminance according to the corresponding relationship between the luminance and the number of the sub-region blocks. The selection module 740 is configured to select a maximum value from all the lowest luminance to determine reference luminance and a reference color channel corresponding to the reference luminance. The obtaining module 750 is configured to obtain target luminance corresponding to the present AEC luminance. The regulation module 760 is configured to perform luminance convergence regulation on the reference color channel according to the target luminance.

Figure 8:
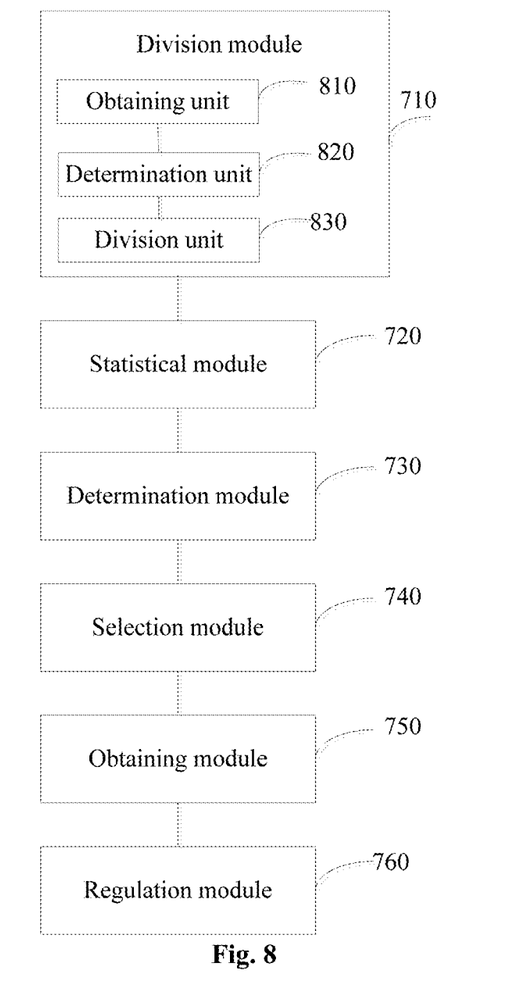
FIG. 8 is a structure schematic diagram illustrating a regulation device for AEC of a region of interest according to another embodiment of the present disclosure.

In an embodiment of the present disclosure, as shown in FIG. 8, the obtaining module 750 may be configured to query first preset AEC information to obtain second luminance corresponding to the present AEC luminance, wherein the second luminance serves as the target luminance.

In an embodiment of the present disclosure, as shown in FIG. 8, the division module 710 may include an obtaining unit 810, a determination unit 820, and a division unit 830.

The obtaining unit 810 may be configured to obtain an area of the region of interest.

The determination unit 820 may be configured to determine a total number of the sub-region blocks corresponding to the area according to preset division granularity information.

The division unit 830 may be configured to divide the region of interest into the plurality of sub-region blocks according to the total number of the plurality of sub-region blocks.

The above-mentioned explanations and descriptions made to the regulation method for AEC of the region of interest are also applicable to the regulation device for AEC of the region of interest in the embodiment of the present disclosure. The implementation principle is similar and will not be elaborated herein.

To sum up, according to the regulation device for AEC of the region of interest in the embodiments of the present disclosure, the region of interest is divided into a plurality of sub-region blocks, statistics is performed on the luminance of all of the plurality of sub-region blocks to construct the luminance histogram of each color channel in the region of interest, the luminance histogram of each color channel is analyzed according to the descending order of the luminance, the corresponding lowest luminance of each color channel which meets a requirement of the present AEC luminance is determined according to the corresponding relationship between the luminance and the number of the sub-region blocks, the maximum value is selected from all the lowest luminance to determine reference luminance and a reference color channel corresponding to the reference luminance, the target luminance corresponding to the present AEC luminance is further obtained, and luminance convergence regulation is performed on the reference color channel according to the target luminance. By adopting the above technical solution of the embodiment, accurate exposure control can be implemented, an overexposed region of the region of interest and a consequent color spot phenomenon can be eliminated, quality of an image can be effectively improved, and a degree of satisfaction of a user can be improved.

Figure 9:
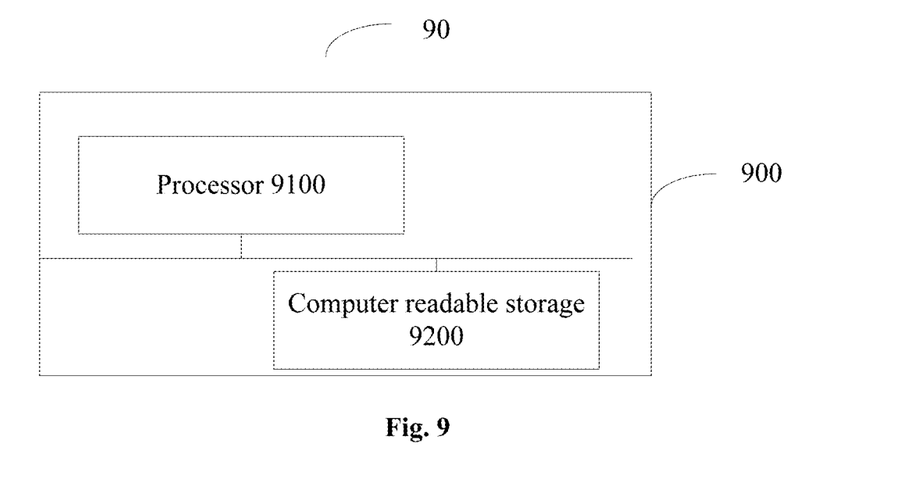
FIG. 9 is a structure schematic diagram illustrating terminal equipment according to an embodiment of the present disclosure.

For implementing the abovementioned embodiments, an embodiment of the present disclosure provides terminal equipment. FIG. 9 is a structure schematic diagram illustrating terminal equipment according to an embodiment of the present disclosure. As shown in FIG. 9, the terminal equipment 90 includes: a casing 900, and a processor 9100 and a computer readable storage 9200 located in the casing 900. The processor 9100 is configured to read an executable program code stored in the computer readable storage 9200 and run a program corresponding to the executable program code to execute the regulation method for AEC of the region of interest described in the abovementioned embodiments.

For implementing the abovementioned embodiments, an embodiment of the present disclosure provides a non-transitory computer-readable storage medium, on which a computer program is stored. The computer program may be executed by a processor to implement the regulation method for AEC of the region of interest in the abovementioned embodiments.

In the descriptions of the specification, descriptions with reference to terms "an embodiment", "some embodiments", "example", "exemplary example", "some examples" or the like refer to that exemplary characteristics, structures, materials or features described in combination with the embodiment or the example are included in at least one embodiment or example of the present disclosure. In the specification, schematic expressions about the terms are not always for the same embodiment or example. In addition, described characteristics, structures, materials or features may be combined in any one or more embodiments or examples in a proper manner. Moreover, those skilled in the art may combine or integrate different embodiments or examples described in the specification and characteristics of different embodiments or examples in case that no conflict is caused.

In addition, terms "first" and "second" are only adopted for simplicity of description and should not be understood as indication or implication of relative importance or implicit indication of the number of specified technical features. Therefore, the technical features limited by the term "first" or "second" may explicitly or implicitly include at least one of the technical features. In the descriptions of the present disclosure, a meaning of "a plurality of" is at least two, for example, two, three or other larger numbers, unless there is other definite or specific limitation.

Any process or method description illustrated in the flowcharts or in other manner herein can be understood to represent a module, segment or part including one or more codes of executable instructions configured to implement steps of customized logic functions or processes. Moreover, the scope of the preferred implementation mode of the present disclosure includes other implementation, in which the functions may be executed not according to the shown or discussed sequence, for example, the involved functions may be performed substantially simultaneously or in an opposite sequence. This should be understood by those skilled in the art of the embodiments of the present disclosure.

Logics and/or steps illustrated in the flowcharts or described in other manners herein, for example, may be considered as a fixed sequence table of the executable instructions configured to implement the logic functions, and may be implemented in any computer-readable medium for an instruction execution system, device or equipment (for example, a computer-based system, a system including a processor or other system capable of reading an instruction from the instruction execution system, device or equipment and executing the instruction) to use or for use in combination with the instruction execution system, device or equipment. For this specification, the "computer-readable medium" may be any device capable of including, storing, communicating with, propagating or transmitting a program for the instruction execution system, device or equipment to use or for use in combination with the instruction execution system, device or equipment. A more exemplary example (non-exhaustive list) of the computer-readable medium includes: an electric connection part (electronic device) with one or more wires, a portable computer disk (magnetic device), a Random Access Memory (RAM), a Read-Only Memory (ROM), an Erasable Programmable ROM (EPROM) (or flash memory), an optical fiber device and a portable Compact Disc Read-Only Memory (CD-ROM). In addition, the computer-readable medium may even be paper or other proper medium on which the program can be printed because the program may be obtained in an electronic manner by, for example, performing optical scanning on the paper or the other medium and then performing edition and explanation or adopting other proper manner when necessary, and then the program may be stored in a computer readable storage.

It should be understood that each part of the present disclosure may be implemented by hardware, software, firmware or a combination thereof. In the abovementioned implementation modes, a plurality of steps or methods may be implemented by software or firmware stored in the computer readable storage and executed by a proper instruction execution system. For example, in case of implementation with hardware, like other implementation mode, any one of the following well-known technologies in this art or a combination thereof may be adopted for implementation: a discrete logic circuit with a logic gate circuit configured to realize a logic function on a data signal, an application specific integrated circuit with a proper combined logic gate circuit, a Programmable Gate Array (PGA), a Field-Programmable Gate Array (FPGA) and the like.

Those having ordinary skill in the art may understand that all or part of the steps of the method in the abovementioned embodiments may be implemented by instructing related hardware by a program. The program may be stored in a computer-readable storage medium. When the program is executed, one or combination of the steps of the method embodiments is implemented.

In addition, each functional unit in each embodiment of the present disclosure may be integrated into a processing module, or each unit may exist physically and independently, or two or more than two units may be integrated into a module. The integrated module may not only be implemented in a hardware form but also be implemented in form of software functional module. If being implemented in form of software functional module and sold or used as an independent product, the integrated module may also be stored in a computer-readable storage medium.

The abovementioned storage medium may be a ROM, a magnetic disk, an optical disk or the like. Although the embodiments of the present disclosure have been shown and described above, it can be understood that the embodiments are exemplary and should not be understood as a limit to the present disclosure. Those having ordinary skill in the art may make variations, modifications, replacements and transformations to the embodiment within the scope of the present disclosure.

What is claimed is:

1. A regulation method for automatic exposure control (AEC) of a region of interest, comprising:
   obtaining a luminance histogram of each color channel in a region of interest based on statistics on luminance of a plurality of sub-region blocks in the region of interest, a luminance histogram of a color channel comprising a corresponding relationship between a luminance and a number of sub-region blocks of the color channel;
   determining a first luminance of the each color channel according to the luminance histogram of the each color channel in the region of interest and the corresponding relationship between the luminance and the number of the sub-region blocks, the first luminance being associated with a present AEC luminance;
   determining a reference luminance based on the first luminance of the each color channel, the reference luminance corresponding to a reference color channel;
   obtaining a target luminance corresponding to the present AEC luminance; and
   performing a luminance regulation on the reference color channel according to the target luminance.

2. The method as claimed in claim 1, further comprising:
   obtaining an area of the region of interest;
   determining a total number of the plurality of sub-region blocks corresponding to the area of the region of interest according to division granularity information, the division granularity information comprising a correspondence between a total number of sub-region blocks and an area of a region of interest, or according to division ratio information, the division ration information comprising a first ratio of a total number of sub-region blocks to an area of a region of interest; and
   dividing the region of interest into the plurality of sub-region blocks according to the total number of the plurality of sub-region blocks.

3. The method as claimed in claim 1, wherein determining the first luminance of the each color channel comprises:
   determining a lowest luminance of the each color channel which meets a requirement of the present AEC luminance according to the luminance histogram of the each color channel in the region of interest and the corresponding relationship between the luminance and the number of the sub-region blocks.

4. The method as claimed in claim 3, wherein determining the lowest luminance of the each color channel which meets the requirement of the present AEC luminance according to the luminance histogram of the each color channel in the region of interest and the corresponding relationship between the luminance and the number of the sub-region blocks comprises:
   determining a total luminance value of the each color channel within a luminance range according to a descending order of the luminance based on the luminance histogram of the each color channel and the corresponding relationship between the luminance and the number of the sub-region blocks; and
   determining the lowest luminance of the each color channel which meets the requirement of the present AEC luminance according to the total luminance value, the luminance range and the present AEC luminance.

5. The method as claimed in claim 4, wherein determining the lowest luminance of the each color channel which meets the requirement of the present AEC luminance according to the total luminance value, the luminance range and the present AEC luminance comprises:
   determining a minimum luminance in the luminance range within which the total luminance value is equal to the present AEC luminance or is larger than the present AEC luminance for a first time to be the lowest luminance of the each color channel which meets the requirement of the present AEC luminance.

6. The method as claimed in claim 1, wherein determining the reference luminance based on the first luminance of the each color channel comprises:
   determining a maximum value in the first luminance of the each color channel as the reference luminance.

7. The method as claimed in claim 1, wherein obtaining the target luminance corresponding to the present AEC luminance comprises:
   obtaining a second luminance corresponding to the present AEC luminance based on first preset AEC information, the second luminance serving as the target luminance.

8. The method as claimed in claim 7, wherein the method further comprises:
   obtaining third luminance corresponding to the second luminance by adopting a gamma curve corresponding to the second luminance.

9. The method as claimed in claim 1, wherein obtaining the target luminance corresponding to the present AEC luminance comprises:
   determining a sum of the numbers of sub-region blocks corresponding to respective luminance between the reference luminance and a luminance peak;
   determining a second ratio of the sum to a total number of the plurality of sub-region blocks in the region of interest; and
   obtaining fourth luminance corresponding to the second ratio based on third preset AEC information, the fourth luminance serving as the target luminance.

10. The method as claimed in claim 1, wherein performing the luminance regulation on the reference color channel according to the target luminance comprises:
    performing luminance convergence regulation on the reference color channel according to the target luminance.

11. The method as claimed in claim 1, wherein the region of interest comprises at least one of: a face region, a sky region or a building region.

12. The method as claimed in claim 1, wherein the method further comprises:
    determining the region of interest.

13. The method as claimed in claim 12, wherein determining the region of interest comprises:
performing subject identification on an image to identify the region of interest where a subject is positioned.

14. The method as claimed in claim 12, wherein determining the region of interest comprises:
performing contour extraction on an image to identify the region of interest where a subject is positioned.

15. The method as claimed in claim 14, wherein performing contour extraction on the image to identify the region of interest where the subject is positioned comprises:
performing a depth information extraction on the image based on corresponding depth information, and determining a contour where the region of interest is positioned according to the different depth information of the region of interest and other regions to determine a position of the contour as the region of interest where the subject is positioned.

16. The method as claimed in claim 12, wherein determining the region of interest comprises:
displaying a preview image in an image previewing region and receiving a selection over the region of interest in the image previewing region.

17. Terminal equipment, comprising:
at least one processor; and
a computer readable storage, coupled to the at least one processor and storing at least one computer executable instructions thereon, which when the at least one computer executable instructions is executed by the at least one processor, cause the at least one processor to carry out following actions:
dividing the region of interest into a plurality of sub-region blocks, and obtaining a luminance histogram of each color channel in the region of interest based on statistics on luminance of the plurality of sub-region blocks in the region of interest, a luminance histogram of a color channel comprising a corresponding relationship between a luminance and a number of sub-region blocks of the color channel;
determining lowest luminance of each color channel which meets present automatic exposure control (AEC) luminance according to the luminance histogram of the each color channel and the corresponding relationship between the luminance and the number of the sub-region blocks;
obtaining a maximum value from the lowest luminance of respective color channels to determine reference luminance, and obtaining a reference color channel corresponding to the reference luminance;
obtaining a target luminance corresponding to the present AEC luminance; and
performing luminance convergence regulation on the reference color channel according to the target luminance.

18. The terminal equipment as claimed in claim 17, wherein obtaining the target luminance corresponding to the present AEC luminance comprises:
querying first preset AEC information to obtain a second luminance corresponding to the present AEC luminance, the second luminance serving as the target luminance; or,
calculating a sum of the numbers of sub-region blocks corresponding to respective luminance between the reference luminance and a luminance peak; calculating a second ratio of the sum to a total number of the plurality of sub-region blocks in the region of interest; and querying third preset AEC information to obtain fourth luminance corresponding to the second ratio, the fourth luminance serving as the target luminance.

19. A non-transitory computer-readable storage medium, on which a computer program is stored, wherein the computer program is executed by a processor to carry out following actions:
obtaining a luminance histogram of each color channel in a region of interest based on statistics on luminance of a plurality of sub-region blocks in the region of interest, a luminance histogram of a color channel comprising a corresponding relationship between a luminance and a number of sub-region blocks of the color channel;
determining a first luminance of the each color channel according to the luminance histogram of the each color channel in the region of interest and the corresponding relationship between the luminance and the number of the sub-region blocks, the first luminance being associated with a present automatic exposure control (AEC) luminance;
determining a reference luminance based on the first luminance of the each color channel, the reference luminance corresponding to a reference color channel;
obtaining a target luminance corresponding to the present AEC luminance; and
performing a luminance regulation on the reference color channel according to the target luminance.

20. The non-transitory computer-readable storage medium as claimed in claim 19, further comprising:
obtaining an area of the region of interest;
determining a total number of the plurality of sub-region blocks corresponding to the area of the region of interest according to division granularity information, the division granularity information comprising a correspondence between a total number of sub-region blocks and an area of a region of interest, or according to division ratio information, the division ration information comprising a first ratio of a total number of sub-region blocks to an area of a region of interest; and
dividing the region of interest into the plurality of sub-region blocks according to the total number of the plurality of sub-region blocks.

* * * * *